May 2, 1939. A. J. HIXON 2,156,692
METHOD OF MANUFACTURING ARTICLES
Filed April 3, 1936 5 Sheets-Sheet 1
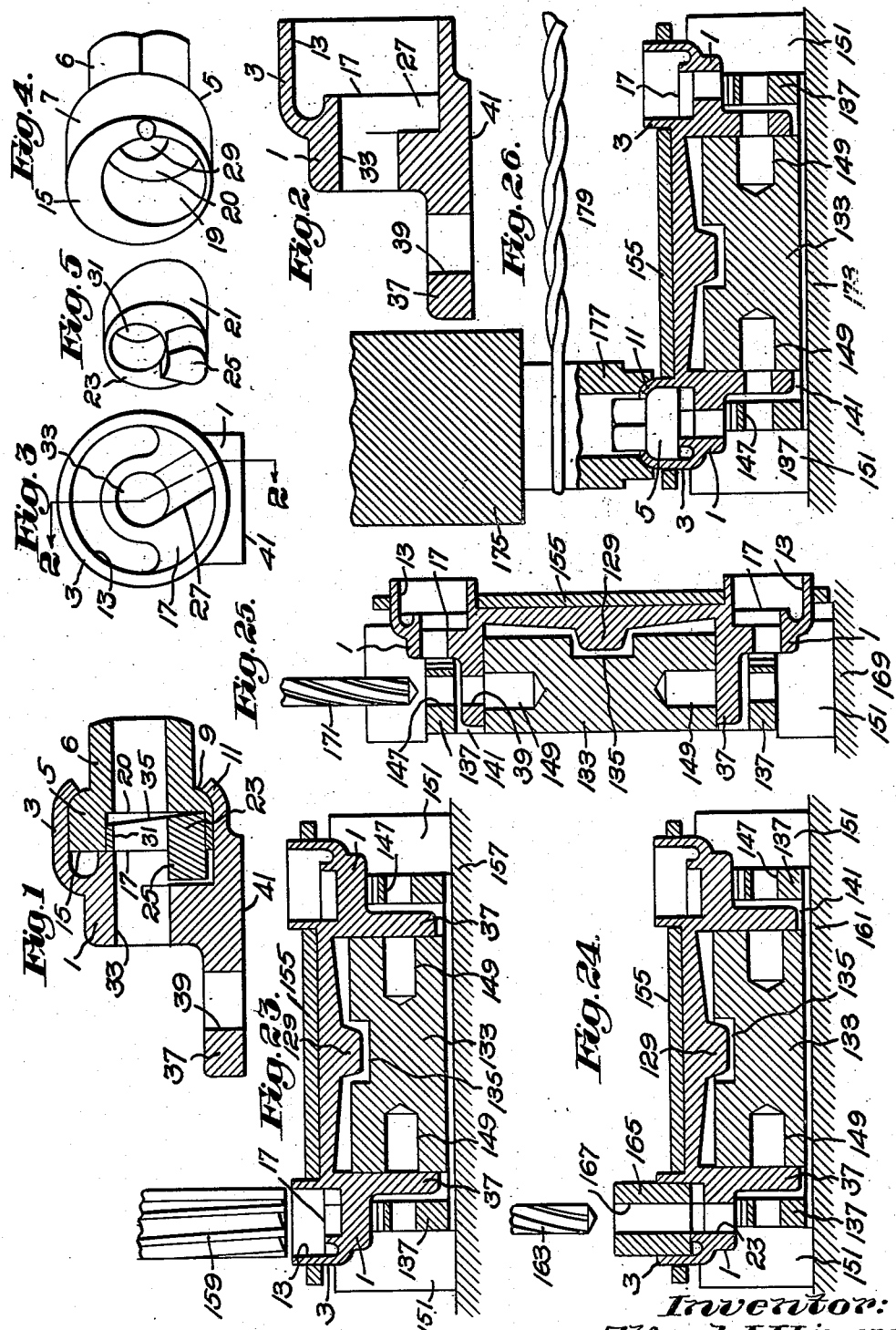

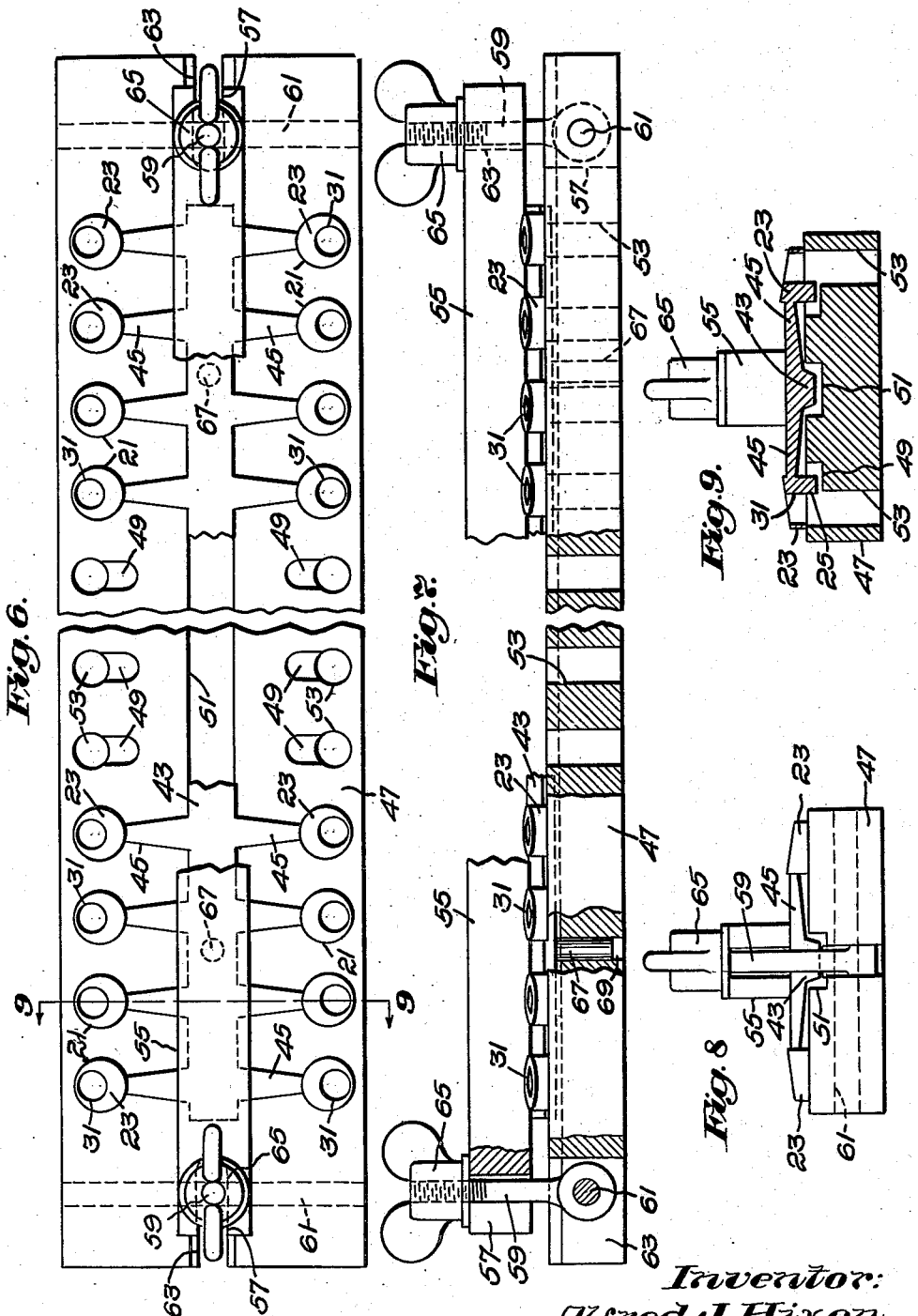

May 2, 1939.  A. J. HIXON  2,156,692
METHOD OF MANUFACTURING ARTICLES
Filed April 3, 1936   5 Sheets-Sheet 3
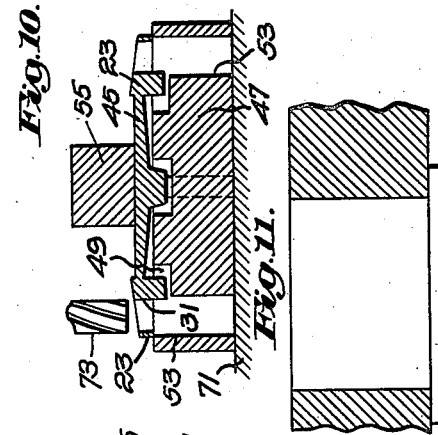
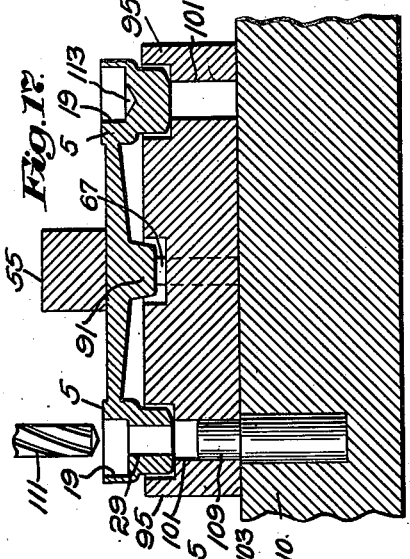
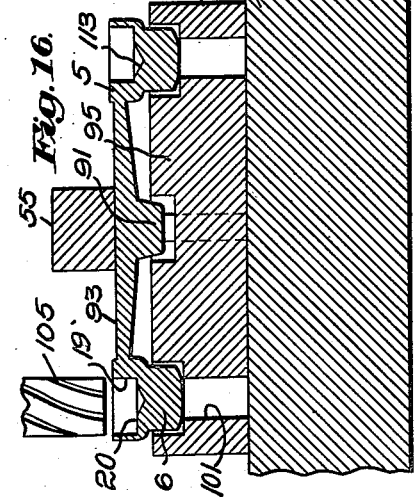
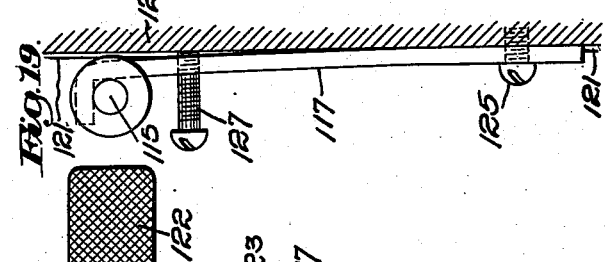
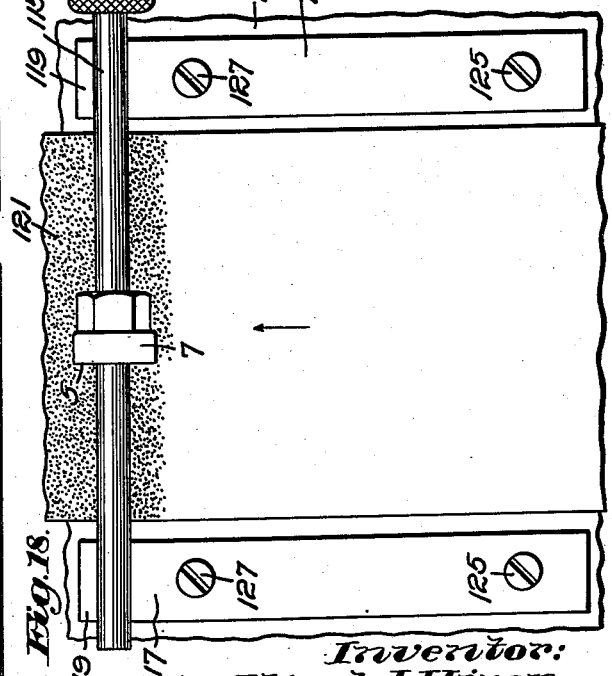
Inventor:
Alfred J. Hixon,
by Emery, Booth, Townsend, Milk & Weidner
Attys May 2, 1939.  A. J. HIXON  2,156,692
METHOD OF MANUFACTURING ARTICLES
Filed April 3, 1936  5 Sheets-Sheet 4
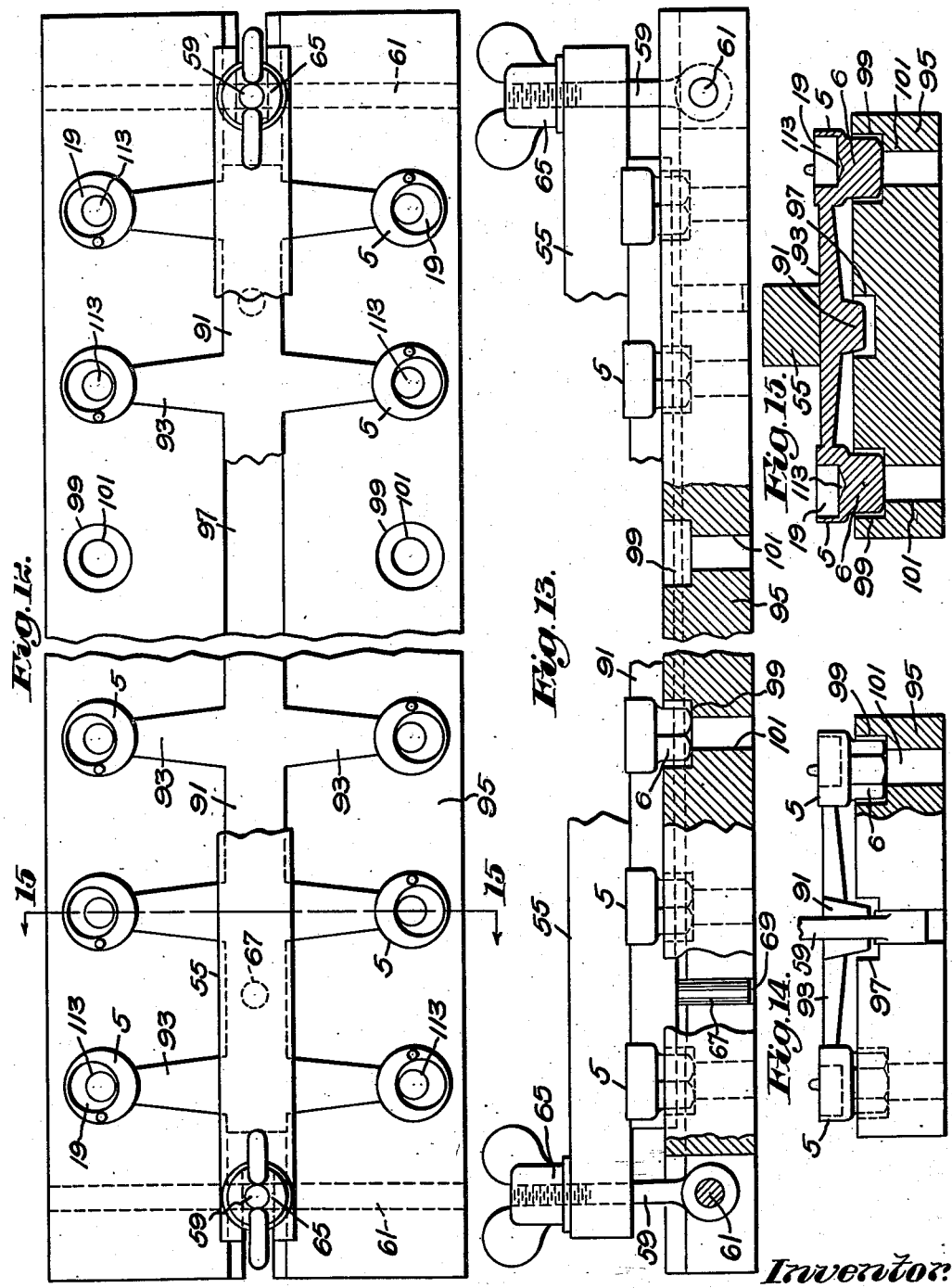
Inventor:
Alfred J. Hixon,
by Emery, Booth, Townsend Miller Warner
Attys.

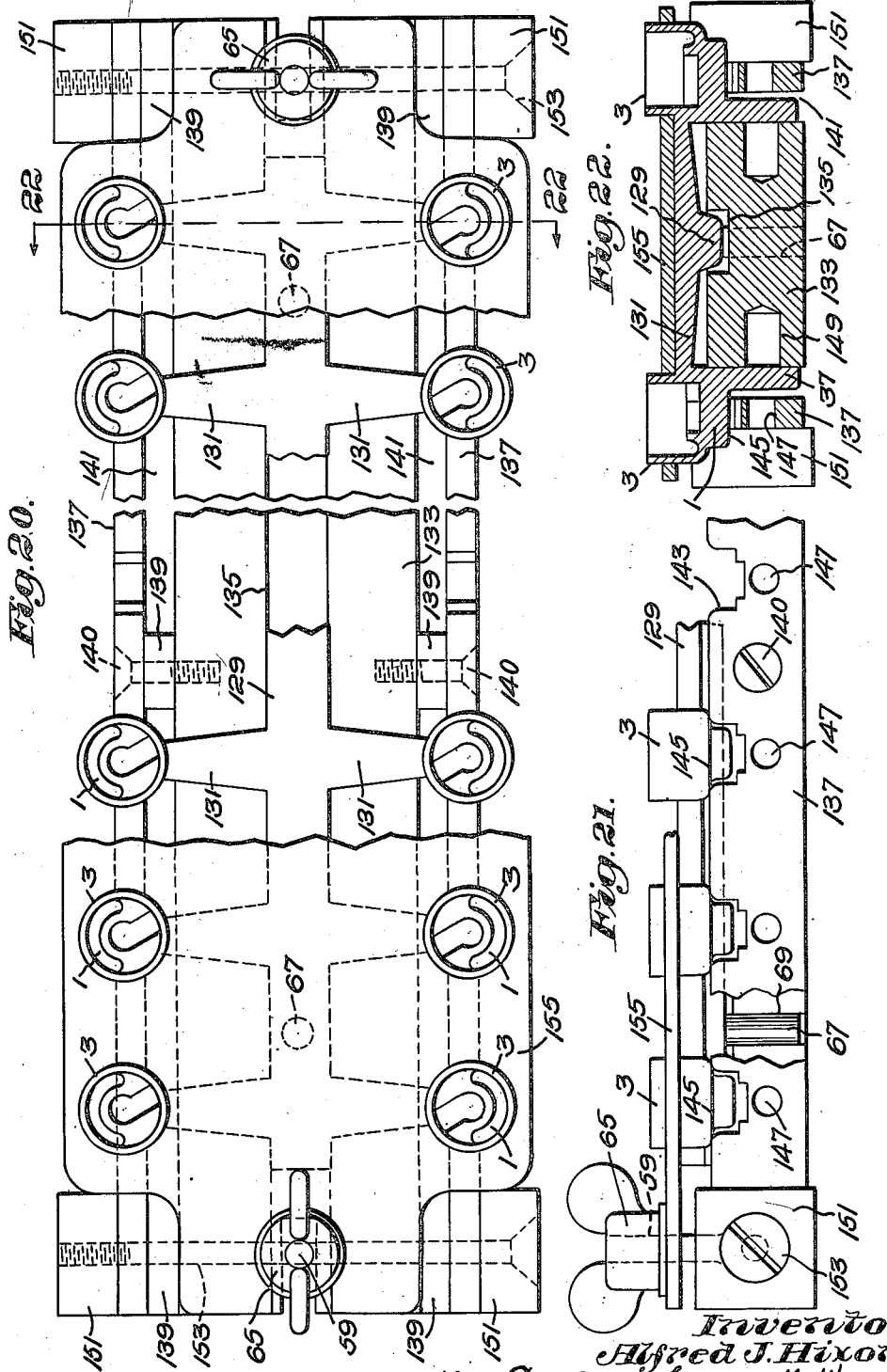

Patented May 2, 1939

2,156,692

UNITED STATES PATENT OFFICE 2,156,692

METHOD OF MANUFACTURING ARTICLES

Alfred J. Hixon, Braintree, Mass.

Application April 3, 1936, Serial No. 72,551

16 Claims. (Cl. 29—148)

My invention relates to a method of manufacturing articles, particularly small machined articles difficult to handle and set up in ordinary machine tools, the method being particularly useful where it is desired to machine small articles, having a plurality of surfaces of revolution in predetermined relation to each other, without resorting to the usual time consuming operation of chucking the articles in a lathe.

The invention will be best understood from the following description of one example of a method of making and assembling the parts of an article selected for illustrative purposes, the scope of which invention will be more particularly pointed out in the appended claims.

In the drawings:

Fig. 1 is a longitudinal section of an article to be made according to the improved process;

Fig. 2 is a longitudinal section of the left hand member of the article according to Fig. 1 before said member is assembled with the other members of the article, and corresponds to a section on the line 2—2 of Fig. 3, which latter is an end elevation of the member as viewed from the right of Fig. 2;

Fig. 4 is a perspective view of the right hand member of the article according to Fig. 1;

Fig. 5 is a perspective view of the center member of the article according to Fig. 1;

Fig. 6 is a plan, with parts broken away, of a casting which includes a plurality of uncompleted members according to Fig. 5 set up on a holder for the casting;

Fig. 7 is a side elevation according to Fig. 6, with parts broken away;

Fig. 8 is an end elevation according to Fig. 6;

Fig. 9 is a section on the line 9—9 of Fig. 6;

Fig. 10 is a section corresponding to Fig. 9, with parts omitted, illustrating the method of reaming the eccentrically positioned bore of the member according to Fig. 5;

Fig. 11 illustrates a step in the method of severing the members according to Fig. 5 from the remainder of the casting and finishing the exterior cylindrical surfaces of said members;

Fig. 12 is a plan, with parts broken away, of a casting which includes a plurality of uncompleted members according to Fig. 4 set up on a holder for the casting;

Fig. 13 is a side elevation according to Fig. 12, with parts broken away;

Fig. 14 is an end elevation of Fig. 12, with parts omitted;

Fig. 15 is a section on the line 15—15 of Fig. 12, with parts omitted;

Fig. 16 is a section corresponding to Fig. 15 illustrating a step in the method of reaming the eccentrically positioned recess of the member according to Fig. 4;

Fig. 17 is a section corresponding to Fig. 15 illustrating a step in the method of drilling the axially positioned bore of the member according to Fig. 4;

Fig. 18 illustrates a step in the method of finishing the exterior cylindrical surface of the member according to Fig. 4;

Fig. 19 is a side elevation of the parts shown in Fig. 18;

Fig. 20 is a plan, with parts broken away, of a casting which includes a plurality of uncompleted members according to Figs. 2 and 3 set up on a holder for the casting;

Fig. 21 is a side elevation of a fragment of Fig. 20;

Fig. 22 is a section on the line 22—22 of Fig. 20, with parts omitted;

Fig. 23 is a section corresponding to Fig. 22, with parts omitted, illustrating a step in the method of reaming the large bore of the member according to Figs. 2 and 3;

Fig. 24 is a section corresponding to Fig. 22, with parts omitted, illustrating a step in the method of drilling the bore of the member according to Figs. 2 and 3;

Fig. 25 is a section corresponding to Fig. 22, with parts omitted, illustrating a step in the method of drilling a hole in the base of the member according to Figs. 2 and 3; and Fig. 26 illustrates a method of securing in assembled relation the three members of the article according to Fig. 1.

The article selected for purposes of illustrating the practice of the improved method comprises a member 1 having a sleeve portion 3 which rotatably receives a member 5, the latter having a nut-like portion 6 of reduced diameter and an exterior cylindrical surface 7 and being formed with a shoulder 9, the end of the sleeve portion 3 being bent over this shoulder to form a flange 11 which restrains the two members against axial separation. It is desirable that the surface 7 of the member 5 and the inner surface 13 of the sleeve 3 be finished so that the members may be freely rotated relative to each other, and for the same reason that the end surface 15 of the member 5 and the abutting surface 17 at the bottom of the socket formed by the sleeve 3 also be finished.

In this article the member 5 is formed with an eccentric recess or opening 19 having finished cylindrical walls and a finished bottom surface 20. The cylindrical surface of this recess forms a bearing surface for the finished exterior cylindrical surface 21 of the ring-like member 23, the latter having a lug 25 projecting from one face thereof which is received in a slot 27 formed in the member 1, so that when the members 1 and 5 are relatively rotated the member 23 will move transversely of the members 1 and 5 to grip to the article a conductor which is inserted in the finished bores or holes 29, 31 and 33 when the parts are in their relative positions shown by Fig. 1. As illustrated, the hole 31 in the member 23 is positioned eccentrically of the member, and the member has its face 35 opposite the lug 25 inclined to its face adjacent the lug to permit tilting of the member when the conductor is gripped, the member having a moderately loose fit in its bearings to permit this tilting.

As illustrated, the member 1 of the article is provided with a lug 37 formed with a drilled hole 39 for use in connecting the article to a bus-bar or the like, the bottom surface 41 of this lug and the adjacent part of the member 1, which surface contacts with the bus-bar, also being finished.

The parts just described preferably are formed as castings, and are afterward finished by machining operations.

As illustrated in Figs. 6 to 9, in the practice of the method a plurality of the members or articles 23, provided with cored holes 31, are formed as part of an integral casting. This casting comprises a central bar-like supporting part 43 which at opposite sides has spaced, laterally projecting arms 45. Each of these arms has joined thereto at its free end one of the members 23, the ends of the arms projecting from the cylindrical surfaces 21 of the articles. As will be observed from inspection of Figs. 6 to 9, all the articles are placed in the same relation to the casting.

The casting which includes the articles 23, when it is to be machined, is placed upon a flat supporting member 47, with the inclined faces 35 of the articles uppermost. This supporting member, in its upper face, has recesses 49 which loosely receive the lugs 25 of the articles, and a groove 51 which loosely receives the bar 43 of the casting, and further is provided with holes 53 which lie below the perforations or openings 31 in the articles.

For securing the casting to the supporting member 47, a bar 55 is provided, which bar overlies the bar 43 of the casting. As shown, this bar 55 at its opposite ends has slots 57 which receive the shanks of eye-bolts 59 swingingly secured by pins 61 in the slotted portions 63 at the ends of the supporting member. In an obvious manner the thumb-nuts 65 are effective to draw the bar 55 toward the member 47 and clamp the casting thereto, the only portions of contact of the casting with the member 47 being the lower faces of the articles 23 from which the lugs 25 project.

Conveniently, to aid in properly positioning the casting upon the support, the bar 43 of the casting is formed with projecting pins 67 which are received in holes 69 formed in the supporting member 47.

After the casting is secured to the support the latter may be placed upon the table 71 (Fig. 10) of a drill press, or other suitable machine tool, which carries a rotatable reamer 73 which may be traversed downwardly while rotating to ream and finish the cored holes 31 formed in the articles 23.

After the hole 31 is reamed the casting may be removed from the support, and the articles severed from the arms 45 of the casting and the exterior surfaces 21 of the articles finished. Conveniently this is done by placing the articles upon a support 75 provided with one or more lugs 77 having reduced diameter portions 79 which enter the reamed holes 31 in the articles. Opposed to the lug 77 is a tubular punching tool 81 which, when it descends, will sever the article 23 from the arm 45 and finish the exterior surface of the article. The lug 77 and punching tool 81 may be part of any suitable punch press in which either the lug or the tool is movable. As shown, the tool has an ejecting plunger 83 of usual construction for ejecting the finished article out of the bore of the tool. This severing and finishing operation may be performed by the operator exerting care to hold the casting in proper relation to the tool so as to maintain the proper angular relation between the exterior cylindrical surface of the article and the eccentrically positioned hole 31 therein. However, if desired, for this purpose a bar 85 or the like, secured in fixed position to the punching instrumentalities, may be provided, which bar has a longitudinally extending slot 87 for slidably receiving the positioning pins 67 of the casting.

The uncompleted members or articles 5 similarly may be cast as integral parts of a casting having a bar-like supporting member 91 and arms 93, as illustrated in Figs. 12 to 15. The supporting member 95 for this casting, as illustrated, is formed in its top surface with a groove 97 for loosely receiving the bar 91 of the casting and with recesses 99 which loosely receive the nut-like portions 6 of the articles. Communicating with the bottoms of these recesses are holes 101 adapted to align with the bores 29 of the articles. As illustrated, the casting is provided with the positioning pins 67 received in holes 69 in the supporting member 95, and the casting is clamped to the supporting member by a bar 55 and thumb-nuts 65 in the manner hereinbefore described. The only contact of the casting with the supporting member 95 is afforded by the ends of the nut-like portions 6 of the articles which rest upon the bottom surfaces of the recesses 99.

After the casting which includes the uncompleted members 5 is set up on the holder 95, the latter may be placed upon the bed 103 (Fig. 16) of a drill press, or similar machine tool, which carries the vertically traversable rotatable side and end reaming tool 105 for reaming the cylindrical surface of the eccentric opening 19 and the bottom surface 20 of this opening. After these surfaces are reamed the member 95 with the casting secured thereto may be placed upon the table 107 (Fig. 17) of a drill press, which table carries an upwardly projecting lug 109 in axial alignment with a rotatable and vertically traversable drill 111. This lug, which fits the holes 101 in the support, positions the articles in proper relation to the drill, so that the holes 29 in the articles formed by the drill will be in proper angular relation to the eccentric recess 19 of each article. Conveniently, to aid in "starting" the drill, the bottoms of the openings 19 of the articles 5 are cast with conically countersunk portions 113 (Figs. 12, 15, 16 and 17) axially aligned with holes 29 in the finished articles.

The articles 5 may now be severed from the casting, either by sawing them, or by use of a punch press similar to that illustrated in Fig. 11. The exterior surfaces 7 of the articles 5 preferably are given a final ground finish. In handling the articles for this finishing operation they may be placed upon a mandrel 115 (Fig. 18) extending through the bore 29 thereof, this mandrel preferably having a slight longitudinal taper so that it will tightly fit said bore and frictionally secure the articles in non-rotatable relation thereto. The mandrel may be placed upon laterally spaced bars 117 having at their ends upstanding portions 119 which, in conjunction with the bodies of the bars, form bearings for the opposite end portions of the mandrel, these bars being positioned at opposite sides of a traversing continuous grinding belt 121 which moves in the direction of the arrow shown in Fig. 18. By rotating the mandrel by use of the knurled head 122 thereof the surfaces 7 of the articles may be ground and finished. As shown, the bars 117 are secured at one end to the frame 123 of the grinding machine by screws 125, and the bars, being flexible, may be raised or lowered relative to the grinding belt by screws 127 which are screw-threaded in the bars and have their projecting ends resting against the adjacent surface portion of the frame.

A plurality of the uncompleted members 1 of the article are also formed as part of a casting which comprises the bar 129 having laterally projecting arms 131, each arm being formed integrally with one of the members, as shown by Figs. 20, 21 and 22. As shown, these articles are cast with the bores 33 and holes 39 thereof omitted. The casting is set up on a support which, as illustrated, comprises the central plate 133 having in its upper surface a groove 135 for loosely receiving the bar 129. At opposite sides of the plate 133 are bars 137, held in spaced relation to the sides of the plate by spacing blocks 139 and screws 140, so as to present a space 141 between the adjacent sides of the plate and bars. As shown, the upper edges of these bars are notched, as indicated at 143, for loosely receiving the body portions of the articles and permitting the shoulders 145 thereof to rest upon the tops of said bars, while the lugs 37 of the articles project into the spaces 141 in contact with the sides of the plate 133. As shown, the bars have holes 147 which act as guides for a drill for forming the holes 39 (Fig. 1) in the members or articles 1, the plate 133 being formed with holes 149 aligned with the holes 147. At the corners of the support are provided blocks 151 the lower edges and outer side faces of which provide feet for the support, these blocks being held in assembled relation with the support by screws 153 which also serve swingingly to support the eyebolts 59. The casting conveniently is positioned upon the support by pins 67 formed integrally with the bar 129 of the casting, which pins enter holes 69 formed in the plate 133. For securing the casting to the support a plate 155 is provided which has openings through which the sleeves 3 of the articles project, this plate resting upon the top surfaces of the arms 131 and bar 129 of the casting, and being secured to the support by the eye-bolts 59 and thumb-nuts 65. The only point of contact of the casting with the support it will be observed is that afforded by the shoulders 145 upon the tops of the bars 137, and by the lugs 37 upon the sides of the plate 133, such contact providing abutments aligned with the portions of the casting to be machined.

After the casting comprising the articles 1 is set up on its support, the latter may be placed upon the bed 157 of a drill press, or other suitable machine tool, having a rotary longitudinal traversable side and end reamer 159 which may operate on the member 1 to ream the interior cylindrical surface 13 of the sleeve 3 and the bottom surface 17 of the socket formed by said sleeve. After the sleeve 3 of the article is reamed the support may be placed upon the bed 161 of a drill press having the drill 163, and a sleeve 165 may be placed in the sleeve 3, this sleeve 165 having a bore 167 for guiding the drill 163 coaxially of the sleeve 3. The drill may then operate on the articles to form the holes 23. The support may then be turned into the position shown by Fig. 25 with the sides of the feet 151 thereof resting upon the bed 169 of a drill press having the drill 171. This drill may be employed for operating on the articles to drill the holes 39 thereof, the holes 147 in the bars 137 acting as guides for the drill and properly positioning the holes 39.

The support carrying the casting comprising the machined articles 1 may then be placed upon the bed 173 of a press, as shown by Fig. 26. The member 21 and member 7 of the article may then be placed in the sleeve 3, and the plunger 175 of the press caused to descend to operate on a tool 177 for forming the flange 11 on the end of the sleeve 3. Conveniently, this tool 177 is provided with a handle 179 which may be grasped by the operator to enable him to place the tool upon the top of one sleeve after the other, and, if desired, the plunger 175 may be long enough to take care of all or a number of the articles without it being necessary to shift the support and casting, it being understood that the stroke of the plunger will not be sufficient to drive the tool downwardly any more than is necessary to form the flange 11. After this the completed articles may be severed, by a saw or the like, from the arms 131 of the casting, and the bottom surfaces 41 of the lugs 37 of the articles finished by a grinding operation.

It will be understood that the method described is applicable to the forming of various articles, and is not limited to the forming of the particular articles or members thereof herein described, and that within the scope of the appended claims wide deviations may be made from the particular steps described without departing from the spirit of the invention.

I claim:

1. The method of making machined cast articles each of which as cast has an opening on a face thereof which comprises forming a casting including a plurality of said articles joined by arms to a supporting part with each article in the same relation to the latter, in which casting said arms are in a common plane and the faces of said articles all face the same way, securing said casting to a holder formed to provide a support for each article beneath said face thereof and adapted to present said articles in like relation to a machine tool for machining said openings, machining said openings of said articles, and severing said articles from said arms.

2. The method of making cast articles each having a machined cylindrical opening with an eccentric cylindrical enlargement which comprises forming a casting including a plurality of said articles joined to arms projecting from a supporting part with each article in the same relation to the latter, placing said casting in a holder adapted to present each article in like relation to a machine tool for machining said openings and to a second machine tool for machining said eccentric enlargements, machining said openings and their enlargements, and severing said articles from said arms.

3. The method of making cast disk-like articles each of which has an opening on a face thereof and has a finished peripheral surface which comprises forming a casting including a plurality of said articles joined by arms to a supporting part, in which casting said arms are in a common plane and the faces of said articles all face the same way, securing said casting to a holder formed to provide a support for each article beneath the face thereof, machining said openings while said casting is upon said support, and severing said articles from said arms and finishing the peripheral surfaces thereof by operating on them with a punch having an opening surrounded by a shearing edge adapted to finish said peripheral surfaces.

4. The method of making cast disk-like articles each of which has an opening on a face thereof and has a finished peripheral surface which comprises forming a casting including a plurality of said articles joined by arms to a supporting part, in which casting said arms are in a common plane and the faces of said articles all face the same way, securing said casting to a holder formed to provide a support for each article beneath the face thereof, machining said openings while said casting is upon said support, removing said casting from said support, placing said articles of said casting upon a support having a lug which fits the openings thereof, and severing said articles from said arms and finishing the peripheral surfaces thereof by operating on them with a punch having an opening surrounded by a shearing edge adapted to finish said peripheral surfaces in predetermined relation to said lug.

5. The method of making machined cast articles each of which has an opening on a face thereof which comprises forming a casting including a plurality of said articles joined by arms to a supporting part, in which casting said arms are in a common plane and the faces of said articles all face the same way, securing said casting to a holder formed to provide a support for each article beneath the face thereof and adapted to cooperate with the work table of a drill press to position said articles in definite relation to the drill thereof, operating on the articles with said drill to form said openings, and severing said articles from said arms.

6. The method of making machined cast articles having openings extending in different directions which comprises forming a casting including a plurality of said articles joined to arms projecting from a supporting part, securing said casting to a holder with the portions of said articles having said openings exposed, said holder being adapted to be positioned in different positions upon a work table for presenting said openings to machine tools, machining said openings of said articles, and severing said articles from said arms.

7. The method of making machined cast articles having openings extending in different directions which comprises forming a casting including a plurality of said articles joined to arms projecting from a supporting part, securing said casting to a holder which has guide openings for a drill for machining at least some of said openings with the portions of said articles having said openings exposed, said holder being adapted to be positioned in different positions upon a work table for presenting said openings to machine tools, machining said openings of said articles, and severing said articles from said arms.

8. The method of forming an article which has a member provided with a sleeve forming a socket portion receiving a shouldered member over the shoulder of which the end of said sleeve is bent which comprises forming a casting including a plurality of members having said sleeves joined to arms projecting from a supporting part, placing said casting upon a holder having a support for the socket portion of each of said members with the openings of said sockets exposed, inserting said shouldered members in said sockets, operating on the ends of said sleeves while said casting is upon said holder to bend said ends over the shoulders of said shouldered members, and severing said members of said casting from the arms thereof.

9. The method of forming an article which has a member provided with a sleeve forming a socket portion receiving a shouldered member over the shoulder of which the end of said sleeve is bent which comprises forming a casting including a plurality of members having said sleeves joined to arms projecting from a supporting part, placing said casting upon a holder having a support for the socket portion of each of said members with the openings of said sockets exposed, inserting said shouldered members in said sockets, operating on the ends of said sleeves while said casting is upon said holder with a die which moves axially of said sleeves toward said holder to bend said ends over the shoulders of said shouldered members, and severing said members of said casting from the arms thereof.

10. The method of forming an article which has a member provided with a sleeve forming a socket portion receiving a shouldered member over the shoulder of which the end of said sleeve is bent which comprises forming a casting including a plurality of members having said sleeves joined to arms projecting from a supporting part, placing said casting upon a holder having a support for the socket portion of each of said members with the openings of said sockets exposed, operating on said members of said casting while upon said holder to machine the interior walls of said sockets, inserting said shouldered members in said sockets, operating on the ends of said sleeves while said casting is upon said holder to bend said ends over the shoulders of said shouldered members, and severing said members of said casting from the arms thereof.

11. The method of forming an article which has a member provided with a sleeve forming a socket portion receiving a shouldered member over the shoulder of which the end of said sleeve is bent which comprises forming a casting including a plurality of members having said sleeves joined to arms projecting from a supporting part, placing said casting upon a holder having a support for the socket portion of each of said members with the openings of said sockets exposed, operating on said members of said casting while upon said holder to machine the interior walls of said sockets, inserting said shouldered members in said sockets, operating on the ends of said sleeves while said casting is upon said holder with a die which moves axially of said sleeves toward said holder to bend said ends over the shoulders of said shouldered members, and severing said members of said casting from the arms thereof.

12. The method of making machined cast articles which comprises forming a casting including a plurality of said articles joined to arms projecting from a supporting part and having positioning means thereon, placing said casting upon a holder having means cooperating with said positioning means and adapted to present said articles to a machine tool, machining said articles, and severing said articles from said arms.

13. The method of making machined cast articles which comprises forming a casting including a plurality of said articles joined to arms projecting laterally from a bar-like supporting part and having positioning means thereon, placing said casting upon a holder having means cooperating with said positioning means and adapted to present said articles to a machine tool, machining said articles, and severing said articles from said arms.

14. The method of making machined cast articles which comprises forming a casting including a plurality of said articles joined to arms projecting from a supporting part with each article in like relation to the latter, securing said casting to a support which engages said articles, said arms and supporting part of said casting holding said articles in like relation to said support, machining said articles by presenting them while on said support to a machine tool, and severing the machined articles from said arms.

15. The method of making machined cast articles which comprises forming a casting including a plurality of said articles joined to arms projecting from a supporting part with each article in like relation to the latter, securing said casting to a support by clamping said arms thereto, which support has article supporting portions on which said articles are positioned in like relation by said arms, machining said articles by presenting them to a machine tool while on said support, and severing the machined articles from said arms.

16. The method according to claim 15, in which the support employed is formed to guide the tool which operates on said articles.

ALFRED J. HIXON.